US011535813B2

(12) United States Patent
Pan et al.

(10) Patent No.: US 11,535,813 B2
(45) Date of Patent: Dec. 27, 2022

(54) INTERESTERIFIED HIGH OLEIC VEGETABLE OILS

(71) Applicant: Bunge Oils, Inc., Chesterfield, MO (US)

(72) Inventors: Shawn Pan, Creve Coeur, MO (US); Marvin Goertz, Wildwood, MO (US)

(73) Assignee: Bunge Oils, Inc., Chesterfield, MO (US)

(*) Notice: Subject to any disclaimer, the term of this patent is extended or adjusted under 35 U.S.C. 154(b) by 15 days.

(21) Appl. No.: 17/048,228

(22) PCT Filed: Apr. 16, 2019

(86) PCT No.: PCT/US2019/027637
§ 371 (c)(1),
(2) Date: Oct. 16, 2020

(87) PCT Pub. No.: WO2019/204280
PCT Pub. Date: Oct. 24, 2019

(65) Prior Publication Data
US 2021/0139812 A1 May 13, 2021

Related U.S. Application Data

(60) Provisional application No. 62/659,505, filed on Apr. 18, 2018.

(51) Int. Cl.
C11C 3/10 (2006.01)
A23D 9/04 (2006.01)
A23D 9/013 (2006.01)

(52) U.S. Cl.
CPC .............. C11C 3/10 (2013.01); A23D 9/013 (2013.01); A23D 9/04 (2013.01)

(58) Field of Classification Search
CPC ... A21D 2/16; A23D 9/00; A23D 9/04; C11C 3/10
See application file for complete search history.

(56) References Cited

U.S. PATENT DOCUMENTS

| 6,106,885 | A * | 8/2000 | Huizinga | C11C 3/10 |
| | | | | 426/607 |
| 6,238,926 | B1 * | 5/2001 | Liu | C11C 3/10 |
| | | | | 426/417 |
| 6,277,433 | B1 | 8/2001 | Lantz et al. | |
| 6,793,959 | B2 | 9/2004 | Nakhasi et al. | |
| 7,247,334 | B2 | 7/2007 | Teran et al. | |
| 8,518,470 | B2 | 8/2013 | Erickson et al. | |
| 8,586,122 | B2 | 11/2013 | McNeill et al. | |
| 9,144,245 | B2 | 9/2015 | Perlman et al. | |
| 2002/0001662 | A1 | 1/2002 | Sahasranamam | |
| 2005/0276900 | A1 | 12/2005 | Ullanoormadam | |
| 2008/0199582 | A1 | 8/2008 | Unger | |
| 2008/0199590 | A1 | 8/2008 | Kincs et al. | |
| 2009/0220653 | A1 | 9/2009 | Doucet | |
| 2009/0311387 | A1 | 12/2009 | Plank et al. | |
| 2010/0015280 | A1 * | 1/2010 | Klemann | C11C 3/10 |
| | | | | 426/549 |
| 2012/0064195 | A1 | 3/2012 | Erickson et al. | |
| 2012/0121786 | A1 * | 5/2012 | Higgins | A23L 33/24 |
| | | | | 426/556 |
| 2012/0308708 | A1 | 12/2012 | Seibold et al. | |
| 2015/0208686 | A1 | 7/2015 | Piispa et al. | |
| 2017/0049121 | A1 | 2/2017 | Higgins et al. | |

FOREIGN PATENT DOCUMENTS

| EP | 3014999 A1 | 5/2016 |
| WO | 2008101094 A1 | 8/2008 |
| WO | 2015110388 A1 | 7/2015 |
| WO | 2019020714 A1 | 1/2019 |

OTHER PUBLICATIONS

Deman, L., et al., Physical and textural evaluation of some shortenings and margarines, JAOCS, vol. 66, No. 1, pp. 128-132 (Year: 1989).*
Ribeiro, A.P.B., et al., Zero trans fats from soybean oil and fuly hydrogenated soybean oil: Physico-chemical properties and food applications, Food Research International, vol. 42, issue 3, pp. 401-410 (Year: 2009).*
Kodali, D.R. Trans fats alternatives, AOCS press, 15 pages (pp. 3, 9-14, 112-113, 124-127) (Year: 2005).*
Masuchi et al., Fats from chemically interesterified high-oleic sunflower oil and fully hydrogenated palm oil, J. Am. Oil Chem. Soc., 91:859-866 (Year: 2014).*
Farmani et al., Trans-free fats through interesterification of canola oil/palm olein or fully hydrogenated soybean oil blends, Eur. J. Lipid Sci. Technol., 111, 1212-1220 (Year: 2009).*
Ahmadi et al., "Functionality and physical properties of interesterified high oleic shortening structured with stearic acid", Food Chemistry, 2009, vol. 117, pp. 668-673.
Li et al., "Lipase-catalyzed interesterification of high oleic sunflower oil and fully hydrogenated soybean oil comparison of batch and continuous reactor for production of zero trans shortening fats", Food Science and Technology, Apr. 1, 2010, vol. 43, No. 3, pp. 458-464.
Xanthina, Magda, "Enzymatic Interesterification of high oleic oil with lauric fat blends for shortening", Sep. 26, 2012, Retrieved from the Internet: URL:https://biblio.ugent.be/record/3032577, Part 1 of 2.
Xanthina, Magda, "Enzymatic Interesterification of high oleic oil with lauric fat blends for shortening", Sep. 26, 2012, Retrieved from the Internet: URL:https://biblio.ugent.be/record/3032577, Part 2 of 2.
International Search Report and Written Opinion for PCT/US2019/027637, dated Jul. 11, 2019, 15 pages.
AOCS, "Solid Fat Content (SFC) by Low-Resolution Nuclear Magnetic Resonance, Direct Method", Commericial Fats and Oils, Revised 2017, Cd 16B-93, 14 pages.
Da Silva et al., "Structured lipids obtained by chemical interesterification of olive oil and palm stearin", LWT—Food Science and Technology, 2010, vol. 43, pp. 752-758.

(Continued)

Primary Examiner — Yate' K Cutliff
(74) Attorney, Agent, or Firm — Armstrong Teasdale LLP

(57) ABSTRACT

The present invention provides for interesterified high oleic vegetable oil and vegetable fat characterized by low trans fat content and characteristics suitable for use in baking, frying and icing applications.

17 Claims, No Drawings

(56) References Cited

OTHER PUBLICATIONS

Farmani et al., "Trans-free fats through interesterification of canola oil/palm olein or fully hydrogenated soybean oil blends", Eur. J. Lipid Sci. Technol., 2009, vol. 111, pp. 1212-1220.
Miasuchi et al., "Fats from Chemically Interesterified High-Oleic Sunflower Oil and Fully Hdrogentated Palm Oil", J Am Oil Chem Soc, 2014, vol. 91, pp. 859-866.

\* cited by examiner

INTERESTERIFIED HIGH OLEIC VEGETABLE OILS

CROSS-REFERENCE TO RELATED APPLICATIONS

This application is a U.S. National Phase Application of PCT/US2019/027637, filed Apr. 16, 2019, which claims the benefit of U.S. Provisional Application No. 62/659,505, filed Apr. 18, 2018, the entire contents of which are hereby incorporated by reference herein.

BACKGROUND OF THE DISCLOSURE

The field of the disclosure relates generally to interesterified high oleic vegetable oils characterized by low trans fat content and suitable for use in cooking applications.

Solid fats including shortening are used in food manufacturing to provide texture and firmness. Shortenings conventionally include saturated fats or oils formed through various processes (e.g., partial hydrogenation) and from sources which result in a significant amount of trans-fatty acids in the composition. Problematically, trans-fatty acids have been associated with health risks including lowering serum high density lipoprotein cholesterol, adverse effects on blood lipids, increase in inflammatory markers in blood, and elevated risks of coronary heart disease.

One possible solution is to reduce the amount of solid fat in conventional hydrogenated shortening compositions, but solid fat reduction compromises functionality and consistency resulting in shortening compositions that are too soft.

A need therefore exists for solid fats and shortenings having reduced trans-fatty acids while maintaining desirable functional properties such as hardness.

BRIEF DESCRIPTION OF THE DISCLOSURE

In some aspects, the present disclosure relates to a composition comprising interesterified high oleic vegetable oil and vegetable fat wherein the interesterified high oleic vegetable oil and vegetable fat has a drop point of from 40° C. to 53° C. and a trans fat content of no more than 1%.

In some other aspects, the present disclosure relates to an icing composition comprising a composition comprising interesterified high oleic vegetable oil and vegetable fat wherein the interesterified high oleic vegetable oil and vegetable fat has a drop point of from 40° C. to 53° C. and a trans fat content of no more than 1%.

In yet other aspects, the present disclosure relates to a cake shorting composition comprising: (i) from about 25 wt. % to about 50 wt. %, or from about 30 wt. % to about 45 wt. % of a composition comprising interesterified high oleic vegetable oil and vegetable fat wherein the interesterified high oleic vegetable oil and vegetable fat has a drop point of from 40° C. to 53° C. and a trans fat content of no more than 1%; (ii) from about 35 wt. % to about 70 wt. %, or from about 40 wt. % to about 65 wt. % high oleic vegetable oil; (iii) from about 2 wt. % to about 20 wt. %, or from 4 wt. % to about 15 wt. % of at least one emulsifier; and (iv) from about 1 wt. % to about 8 wt. %, or from 1 wt. % to about 6 wt. % of mono- and/or di-glyceride.

DETAILED DESCRIPTION

The present disclosure generally relates to compositions comprising interesterified high oleic vegetable oil and vegetable fat. The compositions of the present disclosure are suitable for use as shortenings and possess improved physical properties such as drop point (melting point) and solid fat content (SFC) thereby enabling use in a wide variety of baking applications or as frying shortening.

In any of the various aspects of the disclosure, the interesterified high oleic vegetable oil and vegetable fat may be bleached/deodorized and crystallized to form fat crystals. In some aspects, the interesterified high oleic vegetable oil and vegetable fat (termed base shortening) may be further formulated with one or more additional components selected from a list including, but not limited to, hard fat, liquid oil and emulsifier(s) in order to prepare specialty shortenings suitable for specific applications such as bakery shortening and icing shortening.

High oleic vegetable oils as used herein are defined as having a percentage of oleic acid among the fatty acids in high oleic vegetable oil of at least 60%, at least 65%, at least 70%, at least 75%, or at least 80%. Examples of vegetable oils suitable for the practice of the present disclosure include, without limitation, soybean oil (e.g., high oleic soybean oil), canola oil (e.g., high oleic canola oil) and sunflower oil (e.g., high oleic sunflower oil). Reference is made herein to the soybean oil, but those skilled in the art will recognize that the disclosure is not limited to soybean oil and will recognize that the principles disclosed herein are equally applicable to other oils such as vegetable oils (e.g., sunflower oil and canola oil).

High oleic vegetable (e.g., soybean) oil and vegetable (e.g., soy) fat may interesterified to produce a composition, such as a base shortening, either enzymatically or chemically in order to randomize the acyl chain distribution and form new triglyceride with modified physical properties such as drop point (melting point) and SFC. Enzymatic interesterification (EIE) is known in the art and is a lipase-catalyzed enzymatic reaction that rearranges the fatty acids on the glycerol backbone of a triglyceride. The fatty acid rearrangement may provide structure and functionality to triglycerides by altering melt properties and increasing functionality. Advantageously, enzymatic interesterification generates little or no trans fatty acids and lowers saturated fat content. Suitable lipases are known in the art. One example is Lipozyme® TL available from Novozymes. In some EIE methods, the enzyme is fixed on a bed column, and an oil blend passed through the column for interesterification. Chemical interesterification (CIE) is known in the art and is a reaction done using an alkaline catalyst. Non-limiting examples of suitable alkaline catalysts include sodium methoxide and sodium methanolate.

In some aspects, the high oleic vegetable oil concentration in the EIE reaction is suitably about 50%, about 52%, about 54%, about 56%, about 58%, about 60%, about 62%, about 64%, about 66%, about 68% or about 70%, and any range constructed from those values, such as from about 50% to about 70%. In some preferred aspects, the high oleic vegetable oil is soy.

In some aspects, the vegetable fat content in the EIE reaction is suitably about 30%, about 32%, about 34%, about 36%, about 38%, about 40%, about 42%, about 44%, about 46%, about 48%, or about 50%, and any range constructed from those values, such as from about 30% to about 50%. In some aspects, the soy fat may be partially hydrogenated or fully hydrogenated. In some preferred aspects, the vegetable fat is fully hydrogenated soy fat.

In some aspects, the weight ratio of high oleic vegetable oil to vegetable fat in the EIE reaction is about 2.5:1, about 2.25:1, about 2.1:1, about 2:1, about 1.9:1, about 1.75:1, about 1.5:1, about 1.4:1 about 1.25:1, or about 1:1, and ranges constructed therefrom, such as from about 2.5:1 to about 1:1, from about 2.25:1 to about 1.4:1, from about 2.1:1 to about 1.5:1, or from about 2.1:1 to about 1.9:1.

The drop point of the compositions comprising interesterified high oleic vegetable oil and vegetable fat (e.g., a shortening) is 40° C., about 41° C., about 42° C., about 43° C., about 44° C., about 45° C., about 46° C., about 47° C., about 48° C., about 49° C., about 50° C., about 51° C., 52° C., or 53° C., and ranges constructed from any one of those values, such as for instance, from 40° C. to 53° C., from 40° C. to 52° C., from about 42° C. to about 49° C., or from about 43° C. to about 48° C.

The SFC measured at 10° C. of compositions comprising the interesterified high oleic vegetable oil and vegetable fat is less than 56 or less than 50, such as about 30, about 35, about 38, about 39, about 40, about 41, about 42, about 43, about 44, about 45, about 46, about 47, about 48, about 49, about 50, about 51, about 52, about 53, about 54, or about 55, and ranges constructed from any one of those values, such as for instance, from about 30 to about 55, from about 38 to about 55, from about 30 to about 48, from about 30 to about 50, from about 35 to about 48, or from about 35 to about 45.

The SFC measured at 21.1° C. of compositions comprising the interesterified high oleic vegetable oil and vegetable fat is less than 44 or less than 36, such as about 20, about 25, about 28, about 29, about 30, about 31, about 32, about 33, about 34, about 35, about 36, about 37, about 38, or about 39, and ranges constructed from any one of those values, such as for instance, from about 20 to about 35, from about 22 to about 33, from about 23 to about 30, from about 23 to about 27, from about 25 to about 33, from about 32 to about 43, or from about 35 to about 39.

The SFC measured at 26.7° C. of compositions comprising the interesterified high oleic vegetable oil and vegetable fat is less than 32 or less than 26, such as about 12, about 13, about 14, about 15, about 16, about 17, about 18, about 19, about 20, about 21, about 22, about 23, about 24, about 25, or about 31, and ranges constructed from any one of those values, such as for instance, from about 12 to about 22, from about 13 to about 20, from about 14 to about 18, from about 15 to about 18, from about 22 to about 31, from about 24 to about 28, or from about 16 to about 22.

The SFC measured at 33.3° C. of compositions comprising the interesterified high oleic vegetable oil and vegetable fat is less than 23 or less than 15, such as about 6, about 7, about 8, about 9, about 10, about 11, about 12, about 13, about 14, about 15, about 16, about 17, about 18, about 19, about 20, about 21 or about 22, and ranges constructed from any one of those values, such as for instance, from about 6 to about 14, from about 7 to about 13, from about 8 to about 17, from about 8 to about 12, from about 9 to about 15, from about 15 to about 22, or from about 16 to about 20.

The SFC measured at 40° C. of compositions comprising the interesterified high oleic vegetable oil and vegetable fat is less than 16 or less than 10, such as about 2, about 2.5, about 3, about 4, about 5, about 6, about 7, about 8, about 9, about 9.5, about 10, about 11, about 12, about 13, about 14, or about 15, and ranges constructed from any one of those values, such as for instance, from about 2 to about 8, from about 2.5 to about 9, from about 3 to about 7, from about 4 to about 9, from about 4 to about 6, from about 5 to about 8, or from about 9 to about 15.

In some aspects, the drop point characteristics of the compositions of the present disclosure provide for improved shortening compositions for use in icing applications as compared to shortenings characterized by a drop point of less than 40° C. or greater than 53° C. Shortenings having a drop point of less than 40° C. are generally too soft for formulation in icing applications and generally result in icings not having good structure holding properties which is indicated by at least one adequate physical characteristic of Buskometer slump, Buskometer slide, trench testing, viscosity or funnel test. Shortenings having a drop point of greater than 53° C. are generally too hard for formulation in icing applications and generally result in icings that are difficult to formulate due to excessive hardness, and result in icings that are characterized by high viscosity (making spreading difficult) and poor mouthfeel (e.g., not a creamy texture), and difficult to handle it. Moreover, the SFC profile of the compositions of the present disclosure provides similar advantages as compared to soft shortening compositions having a SFC outside the lower endpoint of the range of the characteristics ranges of the present shortening compositions at least at one of 10° C., 21.1° C., 26.7° C., 33.3° C. and 40° C. and as compared to hard shortening compositions having a SFC outside the upper endpoint of the range of the characteristics ranges of the present shortening compositions at least at one of 10° C., 21.1° C., 26.7° C., 33.3° C. and 40° C.

The crude base shortening produced by the EIE reaction may be bleached and deodorized to remove colorant, moisture, free fatty acid, glycerol, monoglycerides, and other compounds. Bleaching/deodorizing may suitably be done by methods known in the art, such as heating under vacuum over a time period. The bleaching/deodorizing temperature may be up to a final temperature of 450° F. (232° C.) and is typically ramped up to that temperature over a time period of about 2 hours, 4 hours, 5 hours, 6 hours, 7 hours, 8 hours, 9 hours, 10 hours, or longer. Vacuum may suitably be 1 mBar, 1.5 mBar, or 2 mBar, or 4 mBar, or blow.

In a crystallization step, the bleached/deodorized base shortening is processed in a heat exchange unit for heat exchange (cooling) and held at a temperature and for a time sufficient to form fat crystals, thereby forming a base shortening having desired properties. The crystallization unit includes a cooling and a pin worker. The cooling can be two stage cooling following two stage of pin worker mixing, or cooling, pin worker, cooling, pin worker, or cooling, cooling, pin worker, or one stage cooling and one stage mixing. The base shortening may be characterized as shown in Table A below reflecting typical values.

TABLE A

| Test | Range | Range | Range | Test Method |
|---|---|---|---|---|
| Color (Red) | 0-1.5 | 0-1 | 0-0.5 | AOCS Cc 13b-45 |
| Free Fatty Acid | 0-0.1 | 0-0.075 | 0-0.05 | AOCS Ca 5a-40 |
| Peroxide Value | 0-1 | 0-0.75 | 0-0.5 | AOCS Cd 8b-90 |
| SFC 10° C. | 30-48 | 32-45 | 35-40 | AOCS Cd 16b-94 |
| SFC 21.1° C. | 20-35 | 22-33 | 23-30 | AOCS Cd 16b-94 |
| SFC 26.7° C. | 12-22 | 13-20 | 15-18 | AOCS Cd 16b-94 |
| SFC 33.3° C. | 6-14 | 7-13 | 8-12 | AOCS Cd 16b-94 |

TABLE A-continued

| Test | Range | Range | Range | Test Method |
|---|---|---|---|---|
| SFC 40° C. | 2-8 | 3-7 | 4-6 | AOCS Cd 16b-94 |
| Drop Point (° C.) | 39-49 | 41-47 | 42-46 | AOCS Cc 18-80 |
| Iodine Value (Cg/g) | 50-62 | 52-61 | 54-60 | AOCS Cd 1-25 |
| Trans fat | 0-1 | 0-0.75 | 0-0.5 | AOCS Ce 1f-96 |
| Linolenic acid | 0-3 | 0-2.5 | 0-2 | AOCS Ce 1f-96 |
| Oleic acid | 44-58 | 45-56 | 48-54 | AOCS Ce 1f-96 |
| Saturates | 37-45 | 37-44 | 38-43 | AOCS Ce 1f-96 |

The base shortening possesses improved physical properties such as drop point (melting point) and SFC which can be used in different types of bakery applications including, for instance and without limitation, biscuits, pies, cakes, icings, croissants, breads, and frying oils. Specifically, the shortening with high percent of high oleic soy bean oils are soft, low viscosity, white and smooth, and can be used as icing shortening to make icing products such as butter cream icing, pail icing, cake icing, icing creme filler and other different types of icing. In some particular aspects, the base shortening is characterized as indicated in Table B.

TABLE B

| Test | Range |
|---|---|
| Color (Red) | 1.5 maximum |
| Drop Point (° C.) | 48-52 |
| SFC@10.0° C. | 38-55 |
| SFC@21.1° C. | 32-43 |
| SFC@26.7° C. | 22-31 |
| SFC@33.3° C. | 15-22 |
| SFC@40.0° C. | 9-15 |
| Iodine Value | 51 minimum |

The base shortening may be combined with one or more additional ingredients such as, for instance and without limitation, liquid oils, hard fats, and emulsifier(s), and combinations thereof, to make different types of specialty shortenings such as cake shortening, icing shortening and other type of bakery shortening for different types of applications. In some particular aspects, the specialty shortening comprises base shortening and emulsifier. In some other particular aspects, the specialty shortening comprises base shortening, liquid oil, hard fat, and emulsifier.

In any of the various aspects of the disclosure, the content of interesterified fats in the composition (specialty shortening) formed from the base shortening is at least 40%, such as about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 96 wt. %, about 97 wt. %, about 98 wt. %, or about 99 wt. %, and ranges constructed therefrom, such as from about 40 wt. % to about 99 wt. %, from about 70 wt. % to about 98 wt. %, or from about 80 wt. % to about 97 wt. %. In some aspects of the disclosure, two or more interesterified fats formed a different ratios of high oleic vegetable oil to vegetable fat may be selected and combined in the base shortening in order to provide a shortening having desired characteristics such as drop point and SFC at a certain temperature. Suitable blend weight ratios of a first interesterified fat to a second interesterified fat may be about 20:1, about 15:1, about 10:1, about 5:1 or about 1:1, and ranges constructed therefrom, such as from about 20:1 to about 1:1, from about 10:1 to about 1:1, from about 5:1 to about 1:1 or from about 2:1 to about 1:1.

In some aspects, the specialty shortening may comprise the base shortening admixed with one or more emulsifiers which may be suitably selected from, but not limited to, mono- and di-glycerides, ethoxylated mono and diglycerides, polysorbates (e.g., 20, 40, 60 or 80), polyglycerol esters, sorbitan esters, propylene glycol esters, ethoxylated sorbitan esters, and lecithin. Some particular examples of emulsifiers include mono- and di-glycerides and polysorbate 60. In some such aspects, mono- and/or di-glyceride emulsifiers may suitably present in the shortening in a concentration of about 0.1 wt. %, about 0.5 wt. %, about 1 wt. %, about 2 wt. %, about 3 wt. %, about 4 wt. %, about 5 wt. %, about 6 wt. %, about 7 wt. %, about 8 wt. %, about 9 wt. %, or about 10 wt. %, and ranges constructed therefrom, such as from about 1 wt. % to about 10 wt. %, from about 1 wt. % to about 5 wt. %, from about 2 wt. % to about 3 wt. %, from about 2 wt. % to about 8 wt. %, or from about 1 wt. % to about 6 wt. %. In some such aspects, the emulsifier is mono- and di-glyceride, such as Dimodan PT-KA. In some such aspects, the emulsifier is a food emulsifier, such as for instance and without limitation a polysorbate or a polyglycol ester, in a concentration of from about 0.1 wt. % to about 3 wt. %, from about 0.1 wt. % to about 2 wt. %, from about 0.2 wt. % to about 1 wt. % of at least one additional emulsifier may be blended with the base shortening. In some such particular aspects, the polysorbate is polysorbate 60, or polysorbate 80. In some other aspects, the emulsifier may comprise lecithin in a concentration thereof about 0.1 wt. %, about 0.3 wt. %, about 0.5 wt. %, about 1 wt. %, about 2 wt. %, about 3 wt. %, about 4 wt. %, about 5 wt. %, or about 6 wt. %, and ranges constructed therefrom, such as from about 0.1 wt. % to about 6 wt. %, or from about 0.3 wt. % to about 5 wt. %. Combinations of emulsifiers are within the scope of the present disclosure.

In some aspects, the combination of base shortening and one or more emulsifiers may be used as an icing shortening. Such an icing shortening may be characterized by improved functionality for icing such as viscosity, whiteness, smoothness, softness, consistence, smoothness, moisture, and long shelf life. In some aspects, the icing shortening is characterized as indicated in Table C. In some other aspects, the icing shortening is as indicated in Table D.

TABLE C

| Test | Range |
|---|---|
| Color (Red) | 2 maximum |
| Drop Point (° C.) | 48-52 |
| SFC@10.0° C. | 44-48 |
| SFC@21.1° C. | 35-39 |
| SFC@26.7° C. | 24-28 |
| SFC@33.3° C. | 16-20 |
| SFC@40.0° C. | 9-13 |
| Peroxide value | 1 maximum |
| Free Fatty Acids | 0.05 wt. % maximum |

TABLE D

| Test | Range |
| --- | --- |
| Color (Red) | 2 maximum |
| Free fatty acid | 0.15 maximum |
| Drop Point (° C.) | 43-46 |
| SFC@10.0° C. | 30-34 |
| SFC@21.1° C. | 23-27 |
| SFC@26.7° C. | 14-18 |
| SFC@33.3° C. | 8-12 |
| SFC@40.0° C. | 3-7 |
| Peroxide value | 1 maximum |
| Saturated Fatty Acid | 36-41 |
| Monosaturated Fatty Acid | 48-52 |
| Polyunsaturated Fatty Acid | 4-6 |
| Trans Fatty Acid | 0.5 maximum |

In some aspects, specialty shortenings may comprise liquid oils. Non-limiting examples of liquid oils include soy, high oleic soy, canola, high oleic canola, and palm oil. The content of liquid oils in specialty shortenings may suitably be about 0.1 wt. %, about 0.05 wt. %, about 1 wt. %, about 2.5 wt. %, about 5 wt. %, about 7.5 wt. %, about 10 wt. %, about 12.5 wt. %, about 15 wt. %, about 17.5 wt. %, or about 20 wt. %, and ranges thereof, such as from about 0.1 wt. % to about 20 wt. % or from about 2.5 wt. % to about 10 wt. %.

In some aspects, specialty shortenings may comprise solid (hard) fats. Non-limiting examples of solid fats include full or partially hydrogenated cotton, soy, palm or palm stearine. The content of solid fats in specialty shortenings may suitably be about 0.1 wt. %, about 0.05 wt. %, about 1 wt. %, about 2.5 wt. %, about 5 wt. %, about 7.5 wt. %, about 10 wt. %, about 12.5 wt. %, or about 15 wt. %, and ranges thereof, such as from about 1 wt. % to about 15 wt. %, from about 0.1 wt. % to about 10 wt. %, or from about 2.5 wt. % to about 10 wt. %.

In aspects of the disclosure where a specialty shortening comprises liquid oil and solid fat, ratios thereof may be selected and combined with the base shortening in order to provide a specialty shortening having desired characteristics such as drop point and SFC at a certain temperature. Suitable blend weight ratios of a liquid oil to solid fat is not narrowly limited and may be about 10:1, about 7.5:1, about 5:1, about 2.5:1, about 1.5:1, about 1:1, or about 1:2.5, and ranges constructed therefrom, such as from about 10:1 to about 1:2.5, from about 10:1 to about 1:1, or from about 5:1 to about 1:1.

Examples of some blend ranges of interesterified base shortening and other components for example specialty shortenings within the scope of the present disclosure are generally as indicated in Table E below where: the weight ratio range of high oleic vegetable oil to vegetable fat in the EIE reaction is from 1.75:1 to 2.25:1; Emulsifier 1 is mono/di-glyceride; and Emulsifier 2 is polysorbate 60.

TABLE E

| Shortening Type | Base Shortening | Hard Fat | Liquid Oil | Emulsifier 1 | Emulsifier 2 |
| --- | --- | --- | --- | --- | --- |
| All purpose | 70-100 wt. % | 0-10 wt. % | 0-20 wt. % | — | — |
| Cookie | 70-100 wt. % | 0-10 wt. % | 0-20 wt. % | — | — |
| Pie | 70-100 wt. % | 0-10 wt. % | 0-20 wt. % | — | — |
| Biscuit | 70-100 wt. % | 0-10 wt. % | 0-20 wt. % | — | — |
| Cake and Icing | 70-100 wt. % | 0-10 wt. % | 0-20 wt. % | 2-8 wt. % | — |
| Icing | 70-100 wt. % | 0-10 wt. % | 0-20 wt. % | 2-8 wt. % | 0.2-0.6 wt. % |

Generally, the base shortening and any additional ingredients such as emulsifier(s) may formulated by admixing, crystallization and followed by storing at a suitable temperature, such as about 70° F. (21° C.).

EXAMPLES

Example 1

High oleic soy (HOS) and soybean flakes (SHF) were enzymatically interesterified or chemically interesterified (CIE) with alkali catalyst to produce a blend as indicated in Table 1A below. Alkaline catalyst can be sodium methoxide. Samples were analyzed for peroxide value ("PV"), free fatty acid (FFA) and dropping point (DP) and the results are similar as reported in Table 1A below.

HOS 60% and 40% SHF were also chemically interesterified or enzymatically interesterified according to the method above for EIE 65/35 and EIE 67.5/32.5 to produce 60/40 HOS/Soy.

TABLE 1A

| Product | 65/35 HOS/Soy (EIE 65/35) | 67.5/32.5 HOS/Soy (EIE 67.5/32.5) |
| --- | --- | --- |
| High Oleic Soy | 295 kg (65%) | 306 kg (67.5%) |
| Soybean Flakes | 159 kg (35%) | 147 kg (32.5%) |
| PV | 0.8 | 0.5 |
| FFA | 0.36% | 0.27% |
| DP (C) | 43 | 41.5 |

The blends were deodorized under vacuum (mBars) and elevated temperature (°C.) according to the elapsed time schedule in hours as indicated in Table 1B(i) below. Samples were analyzed for peroxide value ("PV") (as measured by AOCS Cd 8-53 in units of Me/Kg) and free fatty acid (FFA) (as measured by AOCS Ca 5a-40) and the results are reported in Table 1B below. Also included in Table 1B(ii) are typical values for: Color (Red) measured by AOCS Cc 13b-45 LOVIBOND; Drop Point as measured by AOCS Cc 18-80 in Celsius); SFC as measured by AOCS Cd 16b-93 in %); Saturated fatty acid, monosaturated fatty acid, polyunsaturated fatty acid, and trans fatty acid as measured by AOCS Ce 1f--96 in %).

TABLE 1Bi

| | EIE 65/35 | | | EIE 67.5/32.5 | | |
| --- | --- | --- | --- | --- | --- | --- |
| Time | Temp | Vacuum | Time | Temp | Vacuum |
| 0 | 44 | — | 0 | 50 | — |
| 1 | 113 | — | 1 | 138 | 1.27 |
| 2 | 172 | 1.33 | 2 | 194 | 1.24 |
| 4:33 | 229 | 1.32 | 3 | 229 | 1.32 |
| 5:33 | 203 | 1.21 | 4 | 203 | 1.25 |
| 6.33 | 202 | 1.13 | 5 | 202 | 1.16 |
| 7:33 | 202 | 1.1 | 6 | 203 | 1.13 |
| 8:46 | 205 | 1.18 | 6:30 | 204 | 1.15 |

TABLE 1Bi-continued

| | EIE 65/35 | | | EIE 67.5/32.5 | |
|---|---|---|---|---|---|
| Time | Temp | Vacuum | Time | Temp | Vacuum |
| PV | 0.2 | | PV | 0.1 | |
| FFA | 0.07% | | FFA | 0.05% | |

TABLE 1Bii

| Property | EIE 65/35 | EIE 67.5/32.5 |
|---|---|---|
| Color | 1.1 | 1.6 |
| FFA | 0.1 | 0.07 |
| PV | 0.6 | 0.7 |
| Drop Point | 43.2 | 41.2 |
| SFC@10.0° C. | 31.1 | 31 |
| SFC@21.1° C. | 25.1 | 22.5 |
| SFC@26.7° C. | 15.6 | 13.3 |

TABLE 1Bii-continued

| Property | EIE 65/35 | EIE 67.5/32.5 |
|---|---|---|
| SFC@33.3° C. | 9.8 | 7.8 |
| SFC@40.0° C. | 5 | 3.7 |
| Saturated Fatty Acid | 38.9 | 37 |
| Monosaturated Fatty Acid | 48.6 | 49.7 |
| Polyunsaturated Fatty Acid | 5.7 | 6.25 |
| Trans Fatty Acid | 0.9 | 1 |

Example 2

Icing shortening blends 1 to 7 were prepared from different blends of base shortening (EIE 65/35 HOS/SHF), liquid oil (high oleic soy), solid fat (fully hydrogenated cotton), monoglycerides, and polysorbate 60. Mettler drop point and SFC at the indicated temperatures were measured. The results are shown in Table 2A below where % refers to wt. %.

TABLE 2A

| Ingredient | Blend 1 | Blend 2 | Blend 3 | Blend 4 | Blend 5 | Blend 6 | Blend 7 |
|---|---|---|---|---|---|---|---|
| Base shortening | 96.3% | 93.6% | 88.6% | 85.6% | 81.6% | 90.6% | 80.6% |
| Liquid oil | — | — | 5% | 8% | 10% | 3% | 10% |
| Solid fat | — | 3% | 3% | 3% | 5% | 3% | 6% |
| Monoglycerides | 3% | 3% | 3% | 3% | 3% | 3% | 3% |
| Polysorbate 60 | 0.4% | 0.4% | 0.4% | 0.4% | 0.4% | 0.4% | 0.4% |
| Drop Point (° C.) | 44.6 | 48.3 | 47.9 | 47.4 | 49.2 | 48.1 | 49.6 |
| SFC-10.0° C. | 32.13 | 41.57 | 38.35 | 39.3 | 50.17 | 36.9 | 40.59 |
| SFC-21.1° C. | 25.04 | 31.59 | 29.66 | 28.88 | 30.06 | 30.39 | 31.09 |
| SFC-26.7° C. | 16.16 | 21.73 | 20.88 | 19.2 | 23.35 | 25.21 | 23.34 |
| SFC-33.3° C. | 10.03 | 14.85 | 14.73 | 14.3 | 15.89 | 14.57 | 16.51 |
| SFC-40.0° C. | 5.3 | 9.64 | 8.42 | 8.31 | 9.78 | 8.53 | 9.69 |

Icing shortening blends 8 to 14 were prepared from different blends of base shortening (EIE 67.5/32.5 HOS/SHF), liquid oil (high oleic soy), solid fat (fully hydrogenated cotton), monoglycerides, and polysorbate 60. Mettler drop point and SFC at the indicated temperatures were measured. The results are shown in Table 2B below where % refers to wt. %.

TABLE 2B

| Ingredient | Blend 8 | Blend 9 | Blend 10 | Blend 11 | Blend 12 | Blend 13 | Blend 14 |
|---|---|---|---|---|---|---|---|
| Base shortening | 96.3% | 93.6% | 88.6% | 85.6% | 81.6% | 90.6% | 80.6% |
| Liquid oil | — | — | 5% | 8% | 10% | 3% | 10% |
| Solid fat | — | 3% | 3% | 3% | 5% | 3% | 6% |
| Monoglycerides | 3% | 3% | 3% | 3% | 3% | 3% | 3% |
| Polysorbate 60 | 0.4% | 0.4% | 0.4% | 0.4% | 0.4% | 0.4% | 9.4$ |
| Drop Point (° C.) | 42.7 | 46.3 | 45.2 | 45.4 | 46.2 | 46.1 | 47.6 |
| SFC-10.0° C. | 30.75 | 39.52 | 36.35 | 37.32 | 48.43 | 34.56 | 38.38 |
| SFC-21.1° C. | 22.41 | 29.03 | 27.66 | 26.32 | 28.43 | 28.34 | 29.46 |
| SFC-26.7° C. | 13.68 | 19.71 | 18.01 | 17.1 | 21.56 | 23.43 | 21.65 |
| SFC-33.3° C. | 8.23 | 12.82 | 12.53 | 12.68 | 13.67 | 12.78 | 14.61 |
| SFC-40.0° C. | 4.42 | 7.76 | 6.42 | 6.81 | 7.1 | 6.45 | 8.71 |

All-purpose shortening blends 15 to 29 were prepared from different blends of: base shortening 1 (EIE 65/35 HOS/SHF) or base shortening 2 (EIE 67.5/32.5 HOS/SHF); solid fat (palm stearin 35 iron value, fully hydrogenated palm stearin, fully hydrogenated soybean oil or fully hydrogenated palm oil); liquid oil (soybean or INES 40 CIE[Palm/PKO]), monoglycerides, and polysorbate 60. INES 40 is chemically interesterified products between palm oil and palm kernel oils. Mettler drop point and SFC at the indicated temperatures were measured. The results are shown in Table 2C below where % refers to wt. %.

TABLE 2C

| Ingredient | Blend 15 | Blend 16 | Blend 17 | Blend 18 | Blend 19 |
|---|---|---|---|---|---|
| EIE 65/35 HOS/SHF | 100% | — | 95% | 90% | 85% |
| EIE 67.5/32.5 HOS/SHF | — | 100% | — | — | — |
| 35 IV Palm Stearin | — | — | 5% | 10% | 15% |
| Fully Hydro. Palm Stearin | — | — | — | — | — |
| Fully Hydro. Soybean Oil | — | — | — | — | — |
| Fully Hydro. Palm Oil | — | — | — | — | — |
| Liquid Soybean Oil | — | — | — | — | — |
| INES 40 - CIE[Palm/PKO] | — | — | — | — | — |
| Drop Point (° C.) | 45.2 | 44.6 | 45.3 | 44.6 | 45.1 |
| SFC-10.0° C. | 44.55 | 38.99 | 47.36 | 50 | 51.55 |
| SFC-21.1° C. | 29.37 | 25.15 | 30.26 | 31.79 | 33.36 |
| SFC-26.7° C. | 19.98 | 16.18 | 20.59 | 22.38 | 23.64 |
| SFC-33.3° C. | 11.52 | 9.26 | 11.44 | 12.41 | 13.19 |
| SFC-40.0° C. | 5.91 | 4.98 | 5.79 | 6.05 | 6.2 |

| Ingredient | Blend 20 | Blend 21 | Blend 22 | Blend 23 | Blend 24 |
|---|---|---|---|---|---|
| EIE 65/35 HOS/SHF | 95% | 90% | 80% | 97% | 95% |
| EIE 67.5/32.5 HOS/SHF | — | — | — | — | — |
| 35 IV Palm Stearin | — | — | — | — | — |
| Fully Hydro. Palm Stearin | 5% | 10% | 10% | — | — |
| Fully Hydro. Soybean Oil | — | — | — | 3% | — |
| Fully Hydro. Palm Oil | — | — | — | — | 5% |
| Liquid Soybean Oil | — | — | 10% | — | — |
| INES 40 - CIE[Palm/PKO] | — | — | — | — | — |
| Drop Point (° C.) | 45 | 44 | 43.6 | 47.2 | 44 |
| SFC-10.0° C. | 47.83 | 50.01 | 45.54 | 48.34 | 35.45 |
| SFC-21.1° C. | 30.17 | 31.12 | 28.54 | 32.55 | 23.37 |
| SFC-26.7° C. | 20.24 | 22.22 | 19.26 | 23.13 | 16.5 |
| SFC-33.3° C. | 12.21 | 12.13 | 10.42 | 14.98 | 10.15 |
| SFC-40.0° C. | 5.97 | 5.28 | 4.97 | 8.35 | 5.2 |

| Ingredient | Blend 25 | Blend 26 | Blend 27 | Blend 28 | Blend 29 |
|---|---|---|---|---|---|
| EIE 65/35 HOS/SHF | 90% | 80% | 95% | 80% | 70% |
| EIE 67.5/32.5 HOS/SHF | — | — | — | — | — |
| 35 IV Palm Stearin | — | — | — | — | — |
| Fully Hydro. Palm Stearin | — | — | — | — | — |
| Fully Hydro. Soybean Oil | — | — | — | — | — |
| Fully Hydro. Palm Oil | 10% | 10% | — | — | — |
| Liquid Soybean Oil | — | 10% | — | — | 10% |
| INES 40 - CIE[Palm/PKO] | — | — | 5% | 20% | 20% |
| Drop Point (° C.) | 43.4 | 42.3 | 44 | 42.5 | 41.9 |
| SFC-10.0° C. | 36.7 | 35.87 | 40.43 | 49.75 | 43.45 |
| SFC-21.1° C. | 25.48 | 22.97 | 27.93 | 30.67 | 26.59 |
| SFC-26.7° C. | 16.5 | 14.98 | 18.39 | 19.49 | 16.03 |
| SFC-33.3° C. | 9.89 | 8.76 | 10.21 | 9.58 | 7.79 |
| SFC-40.0° C. | 5.21 | 4.42 | 5.49 | 4.38 | 3.37 |

All-purpose shortening blends 30 to 44 were prepared from different blends of EIE 60/40 HOS/SHF shortening and EIE 67.5/32.5 HOS/SHF shortening. Mettler drop point and SFC at the indicated temperatures were measured. The results are shown in Table 2D below where % refers to wt. %.

TABLE 2D

| Ingredient | Blend 30 | Blend 31 | Blend 32 | Blend 33 | Blend 34 |
|---|---|---|---|---|---|
| EIE 60/40 HOS/SHF | 100% | 65% | 62.5% | 60% | 57.5% |
| EIE 67.5/32.5 HOS/SHF | 0% | 35% | 37.5% | 40% | 42.5% |
| Drop Point (° C.) | 46.6 | 45.8 | 46.3 | 45.9 | 45 |
| SFC-10.0° C. | 41.16 | 39.93 | 38.83 | 40.66 | 40.99 |
| SFC-21.1° C. | 29.59 | 29.18 | 28.71 | 28.53 | 28.67 |
| SFC-26.7° C. | 19.43 | 18.53 | 18.62 | 18.3 | 18.46 |
| SFC-33.3° C. | 12.41 | 11.67 | 11.58 | 11.31 | 11.34 |
| SFC-40.0° C. | 6.95 | 6.34 | 6.4 | 6.28 | 6.31 |

| Ingredient | Blend 35 | Blend 36 | Blend 37 | Blend 38 | Blend 39 |
|---|---|---|---|---|---|
| EIE 60/40 HOS/SHF | 55% | 52.5% | 50% | 47.5% | 45% |
| EIE 67.5/32.5 HOS/SHF | 45% | 47.5% | 50% | 52.5% | 55% |
| Drop Point (° C.) | 45.4 | 44.2 | 45.4 | 45.6 | 45.7 |
| SFC-10.0° C. | 40.57 | 41.8 | 40.61 | 42.08 | 42.73 |
| SFC-21.1° C. | 28.44 | 28.98 | 28.18 | 28.8 | 28.13 |
| SFC-26.7° C. | 18.11 | 18.57 | 17.73 | 18.64 | 18.23 |

TABLE 2D-continued

| | | | | | |
|---|---|---|---|---|---|
| SFC-33.3° C. | 11.32 | 11.74 | 11.17 | 1.93 | 10.79 |
| SFC-40.0° C. | 6.23 | 6.14 | 6.01 | 5.94 | 6.05 |

| Ingredient | Blend 40 | Blend 41 | Blend 42 | Blend 43 | Blend 44 |
|---|---|---|---|---|---|
| EIE 60/40 HOS/SHF | 42.5% | 40% | 37.5% | 35% | 0% |
| EIE 67.5/32.5 HOS/SHF | 57.5% | 60% | 62.5% | 65% | 100% |
| Drop Point (° C.) | 45.2 | 45.4 | 45.3 | 43.6 | 45.3 |
| SFC-10.0° C. | 42.04 | 42.89 | 42.78 | 43.57 | 44.73 |
| SFC-21.1° C. | 28.27 | 28.62 | 28.18 | 28.03 | 29.65 |
| SFC-26.7° C. | 18 | 18.65 | 18.21 | 17.88 | 19.17 |
| SFC-33.3° C. | 11.4 | 11 | 10.79 | 10.94 | 11.43 |
| SFC-40.0° C. | 5.89 | 5.72 | 5.92 | 5.8 | 6.25 |

Example 3

EIE high oleic soybean oil icing shortenings were prepared from EIE 65/35, EIE 67.5/32.5 and EIE 60/40 from the ingredients listed in Table 3A according to a method where the ingredients were placed in a vessel and melted and votated. A nitrogen purge may optionally be done at a rate selected to achieve a targeted specific gravity. 16 pound to 50 pound cubes were filled and stored at about 70° C. The results are indicated in Table 3A below.

TABLE 3A

| Component | Blend 1 | Blend 2 | Blend 3 |
|---|---|---|---|
| EIE 65/35 | 354 kg (97.6%) | — | — |
| EIE 67.5/32.5 | — | 354 kg (97.6%) | — |
| EIE 60/40 | — | — | 44.3 kg (97.6%) |
| Palm mono- and di-glyceride (Dimodan PT-KA) | 7.3 kg (2%) | 7.3 kg (2%) | 0.9 kg (2%) |
| Polysorbate 60 | 1.5 kg (0.4%) | 1.5 kg (0.4%) | 0.18 kg (0.4%) |

Additional EIE high oleic soybean oil icing shortenings were prepared from EIE 65/35 from the ingredients listed in Table 3B according to a method where the ingredients were placed in a vessel and melted and votated. Additional EIE high oleic soybean oil icing shortenings were prepared from EIE 67.5/32.5 from the ingredients listed in Table 2C according to a method where the ingredients were placed in a vessel and melted and votated. A nitrogen purge may optionally be done at a rate selected to achieve a targeted specific gravity. 2 pound to 12 pound mini-cubes or 50 pound cubes were filled and stored at about 70° C. The results are indicated in Table 3C below.

TABLE 3B

| Component | Blend 4 | Blend 5 | Blend 6 |
|---|---|---|---|
| EIE 65/35 | 118 kg (1000%) | 102 kg (98%) | 70 kg (97.6%) |
| Palm mono- and di-glyceride (Dimodan PT-KA) | — | 2 kg (2%) | 2 kg (2%) |
| Polysorbate 60 | — | — | 0.28 kg (0.4%) |

TABLE 3C

| Component | Blend 7 | Blend 8 | Blend 9 |
|---|---|---|---|
| EIE 67.5/32.5 | 118 kg (1000%) | 102 kg (98%) | 70 kg (97.6%) |
| Palm mono- and di-glyceride (Dimodan PT-KA) | — | 2 kg (2%) | 2 kg (2%) |
| Polysorbate 60 | — | — | 0.28 kg (0.4%) |

Icing prepared from shortening Blends 3, 6 and 9 above were compared with a similarly formulated icing prepared from Cremol and the results are reported in Table 3D. Cremol is characterized by a drop point 115-120° F. (46-49° C.), SFC 51% at 10° C., 30% at 21.1° C., 14% at 33.3° C., 8% at 40° C., iodine value 71 minimum, peroxide value 1 maximum, free fatty acid 0.15% maximum, color red 2 max. Each icing contained about 59 wt. % 6x powdered sugar, about 30 wt. % shortening, about 4 wt. % water, about 3 wt. % non-fat dry milk, about 1 wt. % vanilla, and about 0.5% salt. Specific gravity was determined by filling a 200 mL gravity cup with icing, measuring the icing weight, and calculating weight per volume. Buskometer testing was done to test the icing body, and is an indication if icing will slide off a cake. In the evaluation, a Buskometer is filled with icing, and a spatula is used to flatten out the surface on surface of Buskometer. The Buskometer is then set up vertically on a flat surface for 15 minutes whereupon the icing will slump and be compressed. The distance of compression and of slump is recorded as slide and slump with a slide range on a scale of 0-45 and slump range one a scale of 0-120. Trench is an indication of icing structure and is an evaluation of the smoothness of the icing with a higher score indicating smoother and better structure holding properties. Trench was determined by forming a trench in the icing with a spatula and determining a length in time (in seconds) that the trench is maintained without collapsing. Trench was rated on a scale of 0-4 (where 0 is worst structure and 4 is best structure) where: 0=0 to 5 seconds; 1=6 to 15 seconds; 2=16 to 30 seconds; 3=31 to 60 seconds; and 4=over 60 seconds. Color was rated on a scale of from 1 (bright) to 5 (dull). Viscosity (in cPs) was measured with a Brookfield DV-1 Viscometer using an E-95 Spindle at a rotation speed is 5 rpm. The reading was recorded at the time of every 360 degree of rotation of spindle with the reported viscosity being the average of five readings. The funnel test is an indication of liquid oil and water emulsification. In the funnel evaluation, a funnel is filled with icing and the weight of collected material dripping from the funnel is measured after 24 hours with the reported results being weight collected after the 24-hour evaluation period. Smoothness (Bowl) was rated on a scale of from 1 (fine) to 5 (waspy). Adhesiveness was measured on a scale of from 1 (unadhered) to 5 (tacky). Stiffness was measured on a scale of from 1 (stiff) to 5 (soft). Cell structure was measured on a scale of from 1 (small) to 5 (large). Getaway was measured on a scale of from 1 (clean) to 5 (waxy). Mouthfeel was measured on a scale of from 1 (smooth) to 5 (gritty). Definition retention was measured on a scale of from 1 (sharp) to 5 (slack). Water separation was measured on a scale of from 1 (homogenous) to 5 (weepy).

TABLE 3D

| | Test | | | |
|---|---|---|---|---|
| Ingredient data | Cremol | Blend 3 | Blend 6 | Blend 9 |
| Shortening temp (° C.) | 21 | 21 | 21 | 21 |
| Sugar temp (° C.) | 21 | 21 | 21 | 21 |
| Water temp (° C.) | 21 | 21 | 21 | 21 |
| Specific Gravity | 0.855 | 0.7355 | 0.643 | 0.6366 |
| Buskometer slump | 5 | 0 | 5 | 0 |
| Buskometer slide | 13 | 4 | 8 | 2 |
| Trench rate | 4 | 4 | 4 | 4 |
| Viscosity | 363,400 | 439,000 | 406800 | 409000 |
| Funnel | 0 | 0 | 0 | 0 |
| Color | 3 | 2 | 2 | 2 |
| Smoothness (Bowl) | 2 | 3 | 3 | 3 |
| Spread test | | | 3.5 | 3 |
| Adhesiveness | 4 | 3 | 2.5 | 3 |
| Stiffness | 3 | 2 | 3 | 3 |
| Cell structure | 2 | 3 | 2.5 | 3 |
| Getaway | 3 | 3 | 3 | 2 |
| Mouthfeel | 3 | 2 | 2 | 2 |
| Definition retention | 3 | 2 | | 3 |
| Water separation | 4 | 3 | | 4 |

Example 4

Pie doughs were prepared in duplicate from shortening blends 1 and 2, and from comparative existing shortening 170. The results are reported in Table 4A below where Firmness and Stickiness were measured with a Texture Analyzer. A texture analyzer applies controlled conditions of stress or strain to food and other samples to measure a complete texture profile. It accurately measures compressive and tensile force and position over time using standard test modes including single and multiple cycle compression, tensile strength, compress-and-hold, extend-and-hold, fracturability and springback to describe product texture.

TABLE 4A

| Pie Dough | Firmness (g) | Stickiness (g · mm) |
|---|---|---|
| 146-1 | 154.6 | 488.8 |
| 146-2 | 149.6 | 414.3 |
| 148-1 | 155.1 | 542.9 |
| 148-2 | 129.9 | 437.8 |
| 170-1 | 355.1 | 917.1 |
| 170-2 | 457.9 | 857.7 |

Shortening 146 reduced the dough firmness by 62.6% and shortening 148 reduced the dough firmness by 65% as compared to shortening 170. Shortening 146 reduced the dough stickiness by 49.1% and shortening 148 reduced the dough stickiness by 44.7% as compared to shortening 170.

Example 5

Crème filling icing, butter crème icing and pail icing were prepared by combining Example 3, blend 1, icing shortening with water, sugar and optional corn syrup. The icing compositions are reported in Table 5A below.

TABLE 5A

| Component | Crème filling icing | Butter crème icing | Pail icing |
|---|---|---|---|
| Fat (wt. %) | 25.92 | 29.99 | 24.67 |
| Water (wt. %) | 19.16 | 8 | 6.66 |
| Sugar (wt. %) | 51.84 | 61.76 | 61.66 |
| Corn Syrup (wt. %) | — | — | 6.9 |

The icings of Table 5A were evaluated for specific gravity, Buskometer slump (0-120 scale), Buskometer slide (0-45 scale), trench (0-4 scale), viscosity (cPs), and funnel test (pass/fail). Sensory analysis was also done and is a subjective evaluation by a panel of 3-5 people of the icing including overall perception of the quality of the icing. Trench evaluation was done as previously described. The funnel test was done as previously described. The results are reported in Table 5B below.

TABLE 5B

| Evaluation | Crème filling icing | Butter crème icing | Pail icing |
|---|---|---|---|
| Specific gravity | 0.525 | 0.783 | 0.82 |
| Buskometer slump | 0 | 0 | 0 |
| Buskometer slide | 3 | 7 | 6 |
| Trench | 4 | 4 | 4 |
| Viscosity | 190,000 | 508,300 | 460,000 |
| Funnel Test | 0.1 g | | |
| Sensory | Best eating quality | Acceptable | Acceptable - best mouthfeel |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composition comprising interesterified high oleic vegetable oil and vegetable fat wherein the interesterified high oleic vegetable oil and vegetable fat has a Mettler drop point of from 40° C. to 53° C. and a trans fat content of no more than 1%, wherein the interesterified high oleic vegetable oil and vegetable fat is characterized by a solid fat content as measured by AOCS Cd 16b-93 of one or more of:
   (i) a solid fat content at 10° C. of from about 30% to about 48%;
   (ii) a solid fat content at 21.1° C. of from about 20% to about 35%;
   (iii) a solid fat content at 26.7° C. of from about 12% to about 22%;
   (iv) a solid fat content at 33.3° C. of from about 6% to about 14%; and
   (v) a solid fat content at 40° C. of from about 2% to about 8%
   wherein the high oleic vegetable oil is soy and the vegetable fat is fully hydrogenated soy, and
   wherein the interesterification is enzymatic interesterification.

2. The composition of claim 1 wherein the composition is a shortening.

3. The composition of claim 2 wherein the shortening is any of icing shortening, cake and icing shortening, all purpose shortening, cookie shortening, or pie shortening.

4. The composition of claim 1 having a Mettler drop point of from 40° C. to about 50° C.

5. The composition of claim 1 further comprising at least one other oil, wherein the composition is a blend of: (i) the interesterified high oleic vegetable oil and vegetable fat of claim 1; and (ii) at the least one other oil, wherein the at least one other oil is selected from hard fats, liquid oils, and combinations thereof, wherein the hard fat content is from about 0.1 to about 10 wt. %, wherein the hard fat is selected from fully hydrogenated cotton, fully hydrogenated soy, fully hydrogenated palm, palm stearine, and combinations thereof, and wherein the liquid oil is selected from soy, high oleic soy, canola, high oleic canola, palm, and combinations thereof, and wherein the liquid oil content is from about 0.1 to about 20 wt. %.

6. The composition of claim 1 wherein the high oleic vegetable oil in the interesterified high oleic vegetable oil and vegetable fat has an oleic acid fatty acid content of at least 60%.

7. The composition of claim 1 wherein the interesterified high oleic soybean oil and soy fat is formed from the combination of from about 50% to about 70% high oleic soybean oil and from about 30% to about 50% soy fat.

8. The composition of claim 1 further comprising at least one emulsifier.

9. The composition of claim 8 comprising from about 1 wt. % to about 10 wt. % monoglyceride emulsifier.

10. The composition of claim 9 wherein the monoglyceride comprises a vegetable oil.

11. The composition of claim 10 wherein the monoglyceride is derived from palm oil or soy oil.

12. The composition of claim 8 further comprising from about 0.1 wt. % to about 3 wt. % of an additional emulsifier.

13. The composition of claim 12 wherein the additional emulsifier is polysorbate, polyglycerol esters, or other food emulsifiers.

14. The composition of claim 1 wherein the content of interesterified fat in the composition is at least 60%.

15. An icing shortening comprising the composition of claim 1.

16. A cake and icing shortening comprising the composition of claim 1.

17. An all purpose, pie, cookie shortening comprising the composition of claim 1.

* * * * *